United States Patent
Tsubaki et al.

(10) Patent No.: US 9,809,246 B2
(45) Date of Patent: Nov. 7, 2017

(54) ELECTRIC POWER STEERING APPARATUS

(71) Applicant: NSK LTD., Tokyo (JP)

(72) Inventors: Takahiro Tsubaki, Maebashi (JP);
Tamotsu Oumi, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/786,410

(22) PCT Filed: Apr. 7, 2014

(86) PCT No.: PCT/JP2014/060093
§ 371 (c)(1),
(2) Date: Oct. 22, 2015

(87) PCT Pub. No.: WO2014/175052
PCT Pub. Date: Oct. 30, 2014

(65) Prior Publication Data
US 2016/0059885 A1   Mar. 3, 2016

(30) Foreign Application Priority Data

Apr. 23, 2013 (JP) ................................. 2013-090650
Apr. 1, 2014 (JP) ................................. 2014-075257

(51) Int. Cl.
*B62D 5/04* (2006.01)

(52) U.S. Cl.
CPC ................................. *B62D 5/0472* (2013.01)

(58) Field of Classification Search
CPC .................................................. B62D 5/0472
See application file for complete search history.

(56) References Cited

U.S. PATENT DOCUMENTS

2009/0000857 A1   1/2009 Sugiyama et al.
2015/0284022 A1*  10/2015 Kudo ................... B62D 5/0472
                                                        701/41

FOREIGN PATENT DOCUMENTS

EP   1006042 A2   6/2000
EP   1764284 A2   3/2007
(Continued)

OTHER PUBLICATIONS

International Search Report for PCT/JP2014/060093 dated Jul. 8, 2014.
(Continued)

*Primary Examiner* — Mussa A Shaawat
*Assistant Examiner* — Michael Kerrigan
(74) *Attorney, Agent, or Firm* — Sughrue Mion, PLLC (57) ABSTRACT

[Problem]
An object of the present invention is to provide an electric power steering apparatus that suppresses a handle vibration (noisy sound) being caused by a handle inertia and a spring nature of a torsion bar and improves a steering feeling, without changing of the gain of the PI control.
[Means for solving the problem]
The present invention is an electric power steering apparatus that assist-controls a steering by driving a motor with a current command value calculated based on at least a steering torque, comprising a vibration-damping compensating section that calculates a vibration-damping compensation command value for suppressing a vibration of a handle based on a motor velocity of the motor, wherein the current command value is corrected by the vibration-damping compensation command value.

14 Claims, 9 Drawing Sheets

(56) References Cited

FOREIGN PATENT DOCUMENTS

| | | |
|---|---|---|
| EP | 1839998 A1 | 10/2007 |
| EP | 2116443 A1 | 11/2009 |
| EP | 2221236 A1 | 8/2010 |
| EP | 2256563 A1 | 12/2010 |
| JP | 7-28527 A | 1/1995 |
| JP | 10-310072 A | 11/1998 |
| JP | 2003-212142 A | 7/2003 |
| JP | 2005-262936 A | 9/2005 |
| JP | 2006-188183 A | 7/2006 |
| JP | 2006-335228 A | 12/2006 |
| JP | 2009-280163 A | 12/2009 |
| JP | 2011-121383 A | 6/2011 |
| WO | 2010082292 A1 | 7/2010 |
| WO | 2011/052470 A1 | 5/2011 |
| WO | 2012160850 A1 | 11/2012 |

OTHER PUBLICATIONS

Communication dated Apr. 12, 2017, from the European Patent Office in counterpart European Application No. 14788897.8.

* cited by examiner

FIG.1

PRIOR ART

ELECTRIC POWER STEERING APPARATUS

CROSS REFERENCE TO RELATED APPLICATIONS

This application is a National Stage of International Application No. PCT/JP2014/060093 filed Apr. 7, 2014, claiming priority based on Japanese Patent Application Nos. 2013-090650, filed Apr. 23, 2013, and 2014-075257, filed Apr. 1, 2014, the contents of all of which are incorporated herein by reference in their entirety.

TECHNICAL FIELD

The present invention relates to an electric power steering apparatus that assist-controls a steering system of a vehicle by applying an assist force of a motor driving, through a reduction mechanism, with a current command value calculated based on at least a steering torque, and in particular to an electric power steering apparatus that suppresses a handle vibration (noisy sound) being caused by a handle inertia and a spring nature of a torsion bar and improves a steering feeling.

BACKGROUND ART

An electric power steering apparatus that energizes a steering apparatus of a vehicle by using a rotational torque of a motor as an assist torque, applies a driving force of the motor as the assist torque to a steering shaft or a rack shaft by means of a transmission mechanism such as gears or a belt through a reduction mechanism. In order to accurately generate the steering assist torque, such a conventional electric power steering apparatus (EPS) performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a pulse width modulation (PWM) control.

Figure 1:
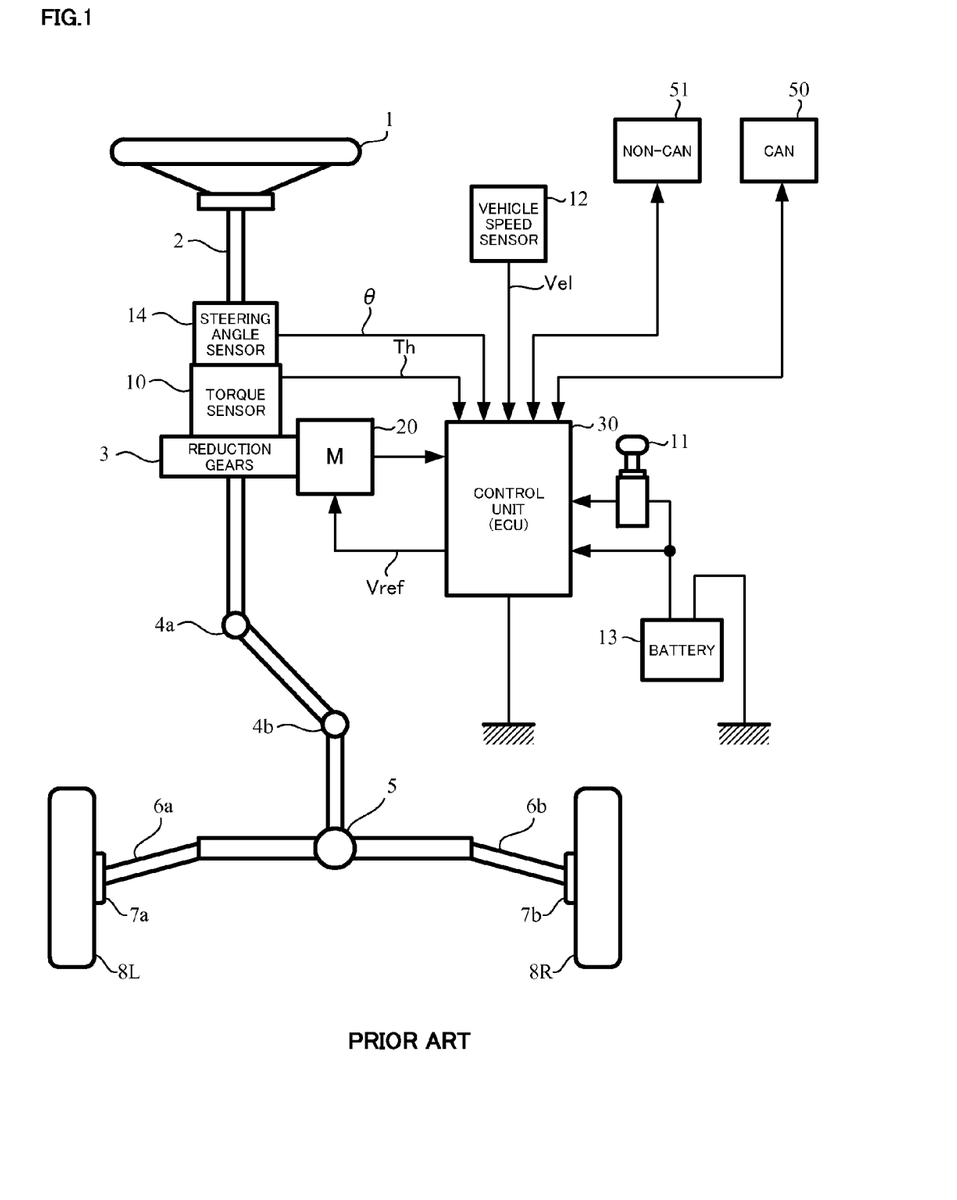
FIG. 1 is a diagram illustrating a configuration example of a general electric power steering apparatus.

A general configuration of a conventional electric power steering apparatus will be described with reference to FIG. 1. As shown in FIG. 1, a column shaft (a steering shaft) 2 connected to a handle (steering wheel) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 are provided with a torque sensor 10 for detecting a steering torque Th of the steering wheel (handle) 1 and a steering angle sensor 14 for detecting a steering angle θ, and a motor 20 for assisting the steering force of the handle 1 is connected to the column shaft 2 through the reduction gears (gear ratio "n") 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command based on a steering torque Th detected by the torque sensor 10 and a vehicle speed Vel detected by a vehicle speed sensor 12, and controls a current supplied to the motor 20 based on a voltage control command value Vref obtained by performing compensation and so on with respect to the current command value in a current control section. Furthermore, the steering angle sensor 14 is not always necessary and it is possible to remove.

A controller area network (CAN) 50 to send/receive various information and signals on the vehicle is connected to the control unit 30, and it is also possible to receive the vehicle speed Vel from the CAN. Further, a Non-CAN 51 is also possible to connect to the control unit 30, and the Non-CAN 51 sends and receives a communication, analogue/digital signals, electric wave or the like except for the CAN 50.

Figure 2:
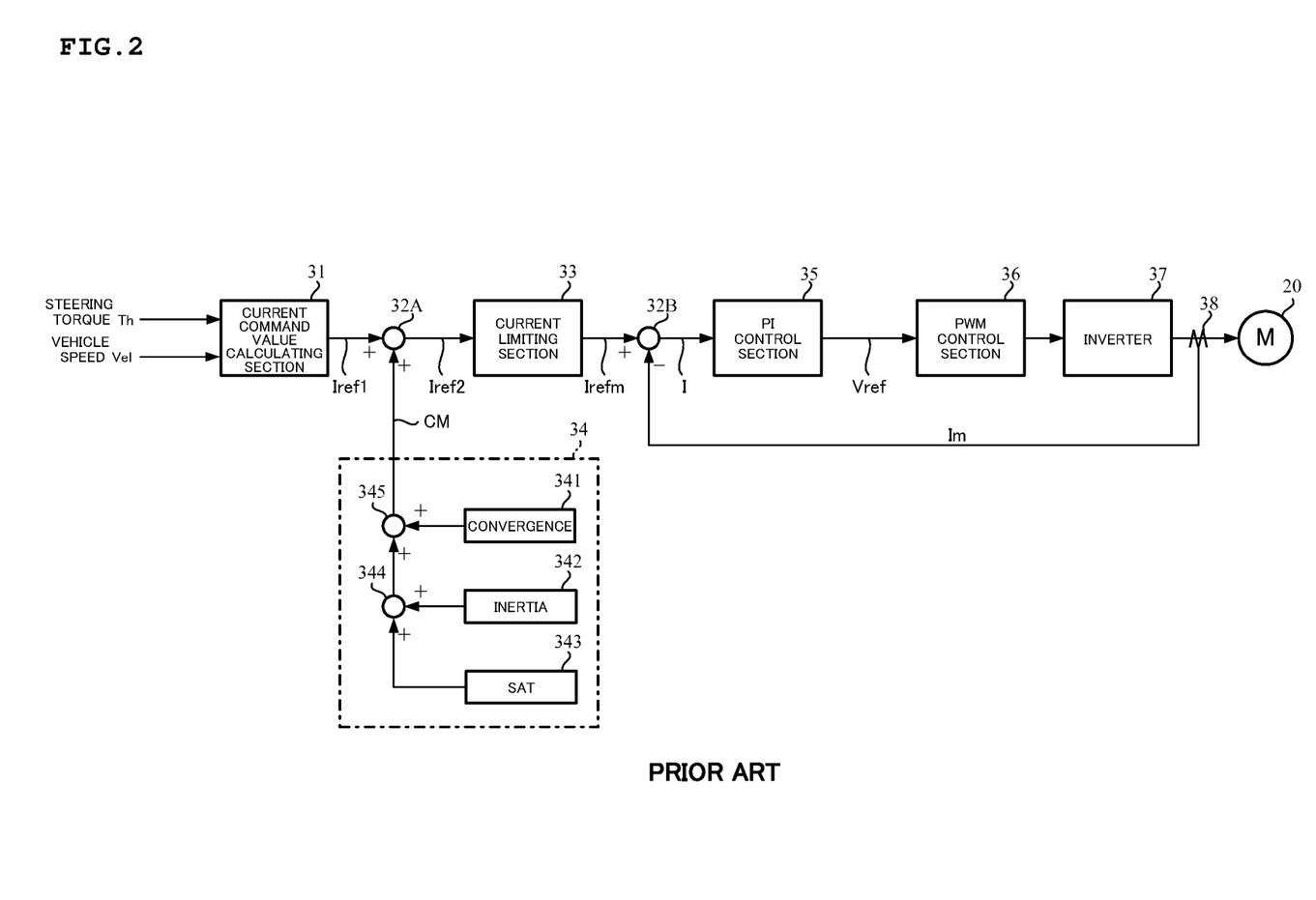
FIG. 2 is a block diagram showing an example of a control system of the electric power steering apparatus.

The control unit 30 mainly comprises a CPU (or an MPU or an MCU), and general functions performed by programs within the CPU are shown in FIG. 2.

Functions and operations of the control unit 30 will be described with reference to FIG. 2. As shown in FIG. 2, the steering torque Th detected by the torque sensor 10 and the vehicle speed Vel detected by the vehicle speed sensor 12 are inputted into a current command value calculating section 31. The current command value calculating section 31 calculates a current command value Iref1 that is the target value of the current supplied to the motor 20 based on the steering torque Th and the vehicle speed Vel and by means of an assist map and so on. The current command value Iref1 is added in an addition section 32A and then the added value is inputted into a current limiting section 33 as a current command value Iref2. A current command value Irefm that is limited the maximum current, is inputted into a subtraction section 32B, and a deviation I (=Irefm−Im) between the current command value Irefm and a motor current value Im that is fed back, is calculated. The deviation I is inputted into a PI control section 35 serving as the current control section. The voltage control command value Vref that characteristic improvement is performed in the PI control section 35, is inputted into a PWM control section 36. Furthermore, the motor 20 is PWM-driven through an inverter 37 serving as a drive section. The current value Im of the motor 20 is detected by a motor current detector 38 and is fed back to the subtraction section 32B. In general, the inverter 37 uses EFTs as switching elements and is comprised of a bridge circuit of FETs.

Further, a compensation signal CM from a compensation signal generating section 34 is added in the addition section 32A, and the compensation of the system is performed by the addition of the compensation signal CM so as to improve a convergence, an inertia characteristic and so on. The compensation signal generating section 34 adds a self-aligning torque (SAT) 343 and an inertia 342 in an addition section 344, further adds the result of addition performed in the addition section 344 and a convergence 341 in an addition section 345, and then outputs the result of addition performed in the addition section 345 as the compensation signal CM.

The CPU (a micro-computer or the like) of such the electric power steering apparatus generates the voltage control command value for controlling the motor by means of the PI control as described above. The gain of the PI control is adjusted to an appropriate value for each vehicle type.

If the gain of the PI control becomes high, the noisy sound and the vibration caused due to a noise are generated. Accordingly, it is necessary to restrict the gain of the PI control no to generate the noisy sound and the vibration. However, if the gain of the PI control is restricted, the frequency characteristic for the current control falls and it is impossible to enhance a responsibility of the steering assist. Further, even if the gain of the PI control is sufficiently fallen, it is also impossible to fully avoid the vibration in the vicinity of a resonance frequency of the steering system and to necessarily get a good steering feeling.

As an apparatus for resolving the above problems, for example, Japanese Published Unexamined Patent Application No. 2006-188183 A (Patent Document 1) is proposed. That is, the electric power steering apparatus disclosed in Patent Document 1 comprises a vibration detecting means to detect a vibration of an operating member and a gain changing means to make at least any one of a proportional gain and an integral gain of a PI control to fall when the vibration is detected by the vibration detecting means.

THE LIST OF PRIOR ART DOCUMENTS

Patent Documents

Patent Document 1: Japanese Published Unexamined Patent Application No. 2006-188183 A

SUMMARY OF THE INVENTION

Problems to be Solved by the Invention

However, the electric power steering apparatus disclosed in Patent Document 1 changes the gain (at least any one of the proportional gain and the integral gain) of the PI control for the current control. Therefore, it is feared that the changing of the gain influences another controls and a steering feeling.

The present invention has been developed in view of the above-described circumstances, and an object of the present invention is to provide an electric power steering apparatus that suppresses a handle vibration (noisy sound) being caused by a handle inertia and a spring nature of a torsion bar and improves a steering feeling, without changing of the gain of the PI control.

Means for Solving the Problems

The present invention relates to an electric power steering apparatus that assist-controls a steering by driving a motor with a current command value calculated based on at least a steering torque, the above-described object of the present invention is achieved by that comprising: a vibration-damping compensating section that calculates a vibration-damping compensation command value for suppressing a vibration of a handle based on a motor velocity of the motor or a factor (a multiplied value) of a steering angle velocity and a gear ratio, wherein the current command value is corrected by the vibration-damping compensation command value.

Further, the above-described object of the present invention is more effectively achieved by that wherein the vibration-damping compensating section comprises a velocity-sensitive table 1 converting before and behind zero of the motor velocity into a trapezoidal-wave type vibration-damping compensation value 1 and a band pass filer (BPF) to output vibration-damping compensation value 2 by BPF-filtering the vibration-damping compensation value 1; or wherein the vibration-damping compensating section comprises a velocity-sensitive table 2 corresponding to a direction of the motor velocity, and a vibration-damping compensation value 3 is outputted from the velocity-sensitive table 2; or wherein the vibration-damping compensating section further including a torque-sensitive gain section to output a vibration-damping compensation value 4 by multiplying a gain 1 sensitive to the steering torque with the vibration-damping compensation value 2 or 3; or wherein the vibration-damping compensating section further including a vehicle speed-sensitive gain section to output the vibration-damping compensation command value by multiplying a gain 2 sensitive to a vehicle speed with the vibration-damping compensation value 4.

Effects of the Invention

According to the electric power steering apparatus of the present invention, since the vibration-damping compensation command value is calculated by means of the velocity-sensitive table and the band pass filter (BPF) based on the motor velocity or the factor (multiplied value) of the steering angle velocity and the gear ratio, the vibration-damping compensation command value generates only at a steering active-return time, and it is possible to limit the influences into another controls and the steering feeling to the minimum.

Further, according to the electric power steering apparatus of the present invention, without the changing of the PI control, it is possible to suppress the handle vibration influenced by the resonance of the suspension system of the vehicle such as brake judder and shimmy and further to suppress the handle vibration that the force is transmitted from the road surface to the steering system during a bad road running and the handle vibration caused by another factors.

MODE FOR CARRYING OUT THE INVENTION

The present invention suppresses a handle vibration (noisy sound) being caused by a handle inertia and a spring nature of a torsion bar and improves a vibration that a driver feels uncomfortable and a steering feeling.

Accordingly, an electric power steering apparatus according to the present invention performs a band pass filer (BPF)-process for a table output value (a vibration-damping compensation value 1) determined by a velocity-sensitive table corresponding to a motor velocity, or performs the BPF-process through the velocity-sensitive table corresponding to a factor (the steering angle velocity*the gear ratio) of a steering angle velocity (a differential component of the steering angle θ) by obtaining the steering angle velocity by differentiating the steering angle θ detected by the steering angle sensor and a gear ratio of a reduction mechanism obtained in advance. The present invention calculates a vibration-damping compensation command value by multiplying the output value (a vibration-damping compensation value 2) of the BPF with a gain due to the steering torque and again due to the vehicle speed. Further, the present invention corrects the calculated vibration-damping compensation command value by subtracting from the current command value of the steering assist, and suppresses the handle vibration by driving the motor with a corrected current command value. The factor of "the steering angle velocity*the gear ratio" is equivalent to the motor velocity ω.

According to the electric power steering apparatus of the present invention, since the vibration-damping compensation command value is calculated by means of the velocity-sensitive table and the BPF by inputting the motor velocity or the factor of the steering angle velocity and the gear ratio, the vibration-damping compensation command value generates only at a steering active-return time, and it is possible to suppress the influences into another controls and the steering feeling to the minimum.

Hereinafter, embodiments of the present invention will be described with reference to the accompanying drawings.

Figure 3:
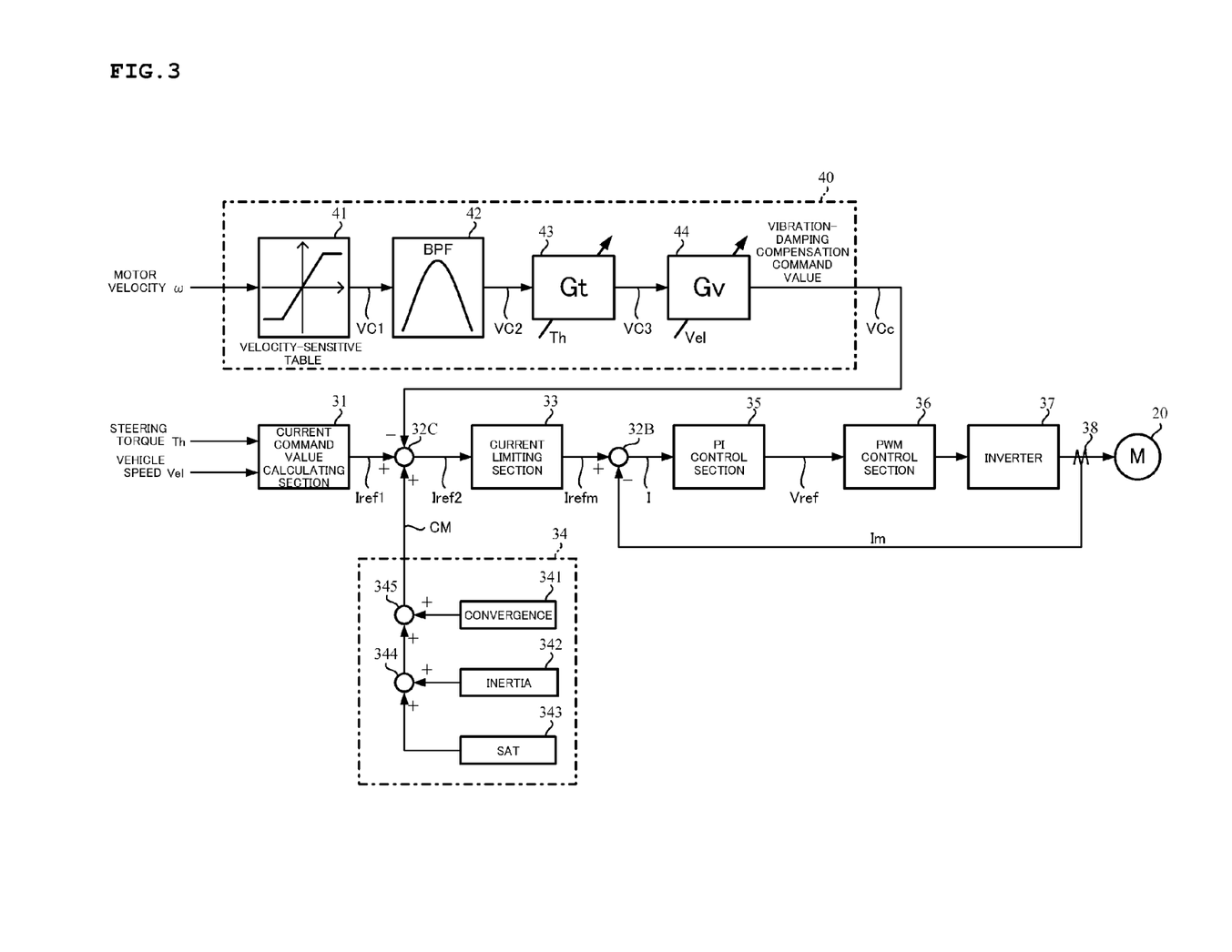
FIG. 3 is a block diagram showing a configuration example (the first embodiment) of the present invention.

FIG. 3 shows a configuration example (the first embodiment) of the present invention corresponding to FIG. 2, the present invention newly provides a vibration-damping compensating section 40. The vibration-damping compensating section 40 corrects the current command value Iref1 by subtraction-inputting a vibration-damping compensation command value VCc calculated in the vibration-damping compensating section 40 based on the motor velocity ω into a subtracting section 32C and compensates the vibration of the handle. That is, in the present invention, the current command value Iref1 and the compensation signal CM are addition-inputted into the addition/subtraction section 32C, the vibration-damping compensation command value VCc calculated in the vibration-damping compensating section 40 is subtraction-inputted into the addition/subtraction section 32C, and obtains the current command value Iref2 by correcting the current command value Iref1 described above. The operations after the current command value Iref2 are the same in FIG. 2.

Further, the compensation due to the compensation signal CM in the compensation signal generating section 34 is not always necessary.

The vibration-damping compensating section 40 comprises a velocity-sensitive table 41 to input the motor velocity ω and output a trapezoidal-wave type vibration-damping compensation value VC1 at before and behind zero of the motor velocity ω, a band pass filter (BPF) 42 to band-pass filter the vibration-damping compensation value VC1 from the velocity-sensitive table 41, a torque-sensitive gain section 43 to multiply a gain Gt corresponding to the steering torque Th with the vibration-damping compensation value VC2 from the BPF 42, and a vehicle spped-sensitive gain section 44 to multiply a gain Gv corresponding to the vehicle speed Vel with the vibration-damping compensation value VC3 from the torque-sensitive gain section 43 and to output a vibration-damping compensation command value VCc.

Figure 4:
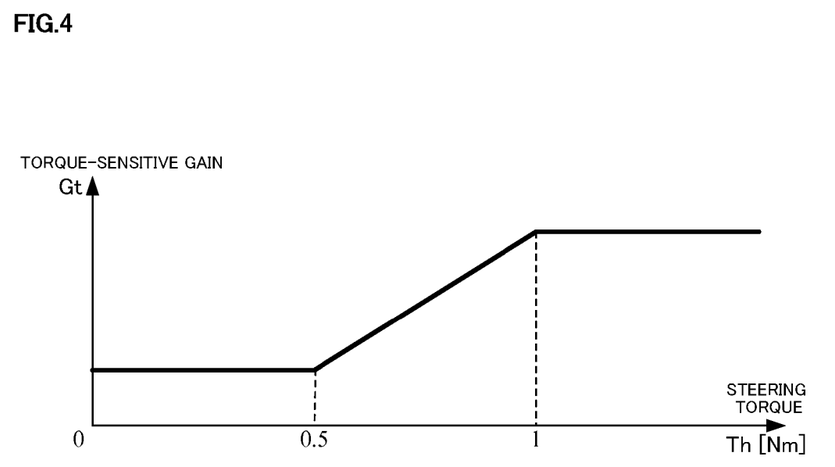
FIG. 4 is a characteristic diagram showing a characteristic example of the torque-sensitive gain section.

The torque-sensitive gain section 43 has a characteristic for the steering torque Th as shown in FIG. 4. The torque-sensitive gain Gt holds a constant gain till a predetermined torque value 1 (0.5 Nm in this embodiment), increases from the predetermined torque value 1 to a predetermined torque value 2 (1.0 Nm in this embodiment) and holds a constant value at equal to or more than the predetermined torque value 2. That is, the characteristic is that is small value when the steering torque Th is small, gradually increases from a value (the predetermined torque value 1) and saturates at a value (the predetermined torque value 2). Thus, it is possible to easily get more effects in a state when the handle vibration is great (the steering torque detecting the torsion angle is great).

Figure 5:
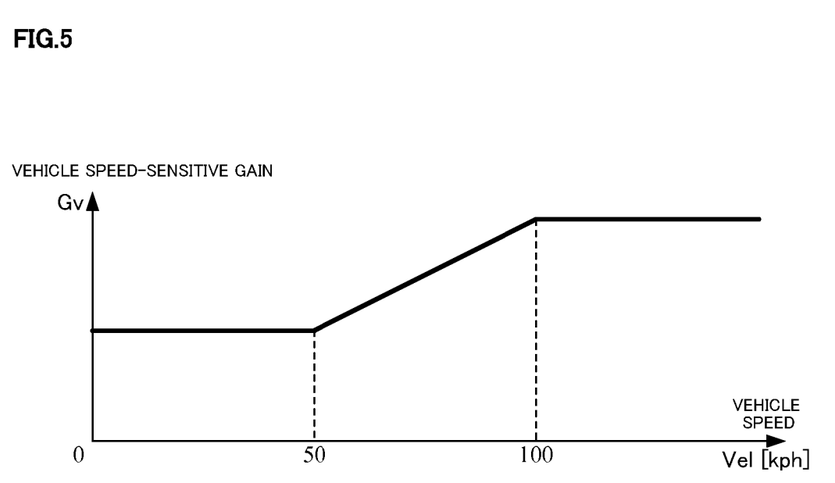
FIG. 5 is a characteristic diagram showing a characteristic example of the vehicle speed-sensitive gain section.

Further, the vehicle speed-sensitive gain section 44 has a characteristic for the vehicle speed Vel as shown in FIG. 5. The vehicle speed-sensitive gain Gv holds a constant gain till a predetermined vehicle speed 1 (50 kph in this embodiment), increases from the predetermined vehicle speed 1 to a predetermined vehicle speed 2 (100 kph in this embodiment) and holds a constant value at equal to or more than the predetermined vehicle speed 2. That is, the characteristic is that is small value when the vehicle speed Vel is low, gradually increases from a value (the predetermined vehicle speed 1) and saturates at a value (the predetermined vehicle speed 2). Thus, it is possible to easily get more effects in a vehicle speed state when the handle vibration is great.

Further, arrangement of the torque-sensitive gain section 43 and the vehicle speed-sensitive gain section 44 may be alternative.

In such a configuration as described above, the operation example will be described with reference to a flow chart of FIG. 6.

First, the steering torque Th is inputted (Step S1), the vehicle speed Vel is inputted (Step S2), and the current command value Iref1 is calculated in the current command value calculating section 31 (Step S3).

The vibration-damping compensating section 40 inputs the motor velocity ω (Step S10) and obtains the vibration-damping compensation value VC1 corresponding to the motor velocity ω in the velocity-sensitive table 41 (Step S11). Next, the vibration-damping compensating section 40 inputs the vibration-damping compensation value VC1 into the BPF 42 and performs a BP-filtering process (Step S12), inputs the BP-filtering processed vibration-damping compensation value VC2 into the torque-sensitive gain section 43, and multiply the gain Gt corresponding to the steering torque Th with vibration-damping compensation value VC2 (Step S13). The gain-processed vibration-damping compensation value VC3 is inputted into the vehicle speed-sensitive gain section 44 (Step S14), and the vibration-damping compensation command value VCc multiplied with gain Gv corresponding to the vehicle speed Vel is outputted (Step S15).

Further, the compensation signal generating section 34 generates the compensation signal CM due to the convergence 341, the inertia 342 and the SAT 343 and outputs the compensation signal CM as described above (Step S20).

Furthermore, the orders of the calculation of the current command value Iref1 (Steps S1 to S3), the calculation of the vibration-damping compensation command value VCc (Steps S10 to S15) and the generation of the compensation signal CM (Step S20) are optionally changeable.

The current command value Iref1, the vibration-damping compensation command value VCc and the compensation signal CM which are obtained as described above, are inputted into the addition/subtraction section 32C and are addition/subtraction-processed therein, and the current command value Iref2 is generated (Step S30). The current command value Iref2 is limited in the current limiting section 33 and then is current-controlled in the PI control section 35 as described above (Step S31), and the motor 20 is drive-controlled through the PWM control section 36 and the inverter 37 (Step S32).

Figure 7:
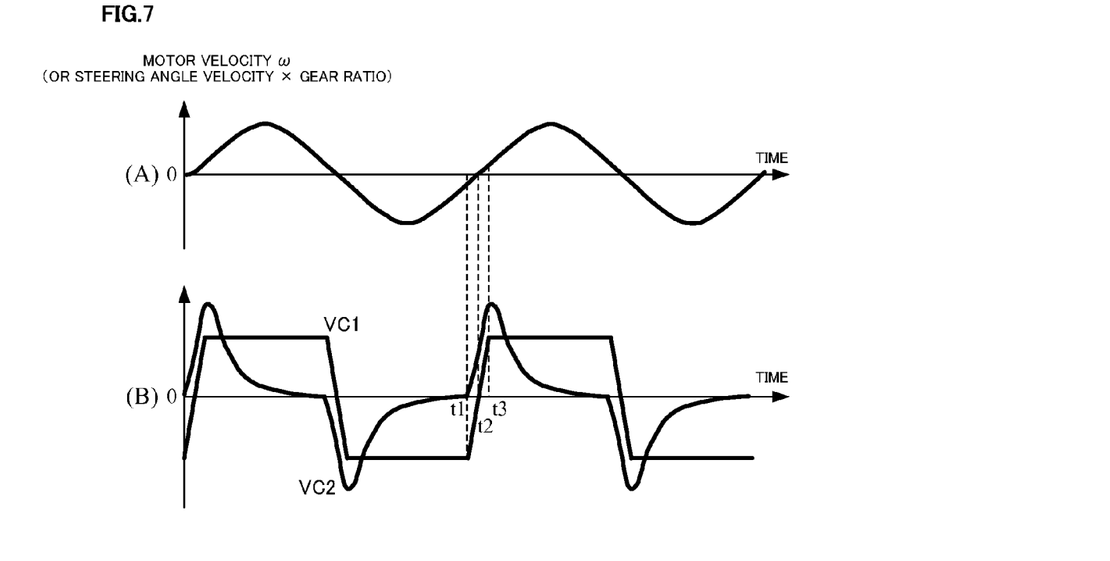
FIG. 7 is a time chart showing an operation example of the BPF which is used in the present invention.

The motor velocity ω vibrates with a sine-wave as shown in FIG. 7(A), the velocity-sensitive table 41 has a characteristic to output a trapezoidal-wave type vibration-damping compensation value VC1 before and behind zero of the motor velocity ω when the motor velocity ω is inputted into the velocity-sensitive table 41. Therefore, the vibration-damping compensation value VC1 outputted from the velocity-sensitive table 41 is a trapezoidal-wave as shown in FIG. 7(B). The vibration-damping compensation value VC1 outputted from the velocity-sensitive table 41 is inputted into the BPF 42, only the intermediate frequency component that a high frequency component (e.g. 20 Hz or more) and a low frequency component (e.g. 5 Hz or less) are removed, passes, and the vibration-damping compensation value VC2 is outputted as shown in FIG. 7(B).

As shown in FIGS. 7(A) and (B), it is possible to advance in time (a time point t1) the vibration-damping compensation value VC2 than a time point t2 when the motor velocity ω and the vibration-damping compensation value VC1 cross zero by band-pass filtering the trapezoidal-wave type vibration-damping compensation value VC1 in the BPF 42. The component of the vibration-damping compensation value VC2 becomes the current command value (the vibration-damping compensation value VCc) for the suppression of the handle vibration, and the vibration-damping compensation value VCc is subtracted from the current command value Iref1 for the steering. Consequently, it is capable of suppressing the vibration of the motor by delaying the vibration of the motor velocity ω adjusting the timing when the motor velocity ω crosses zero.

Figure 8:
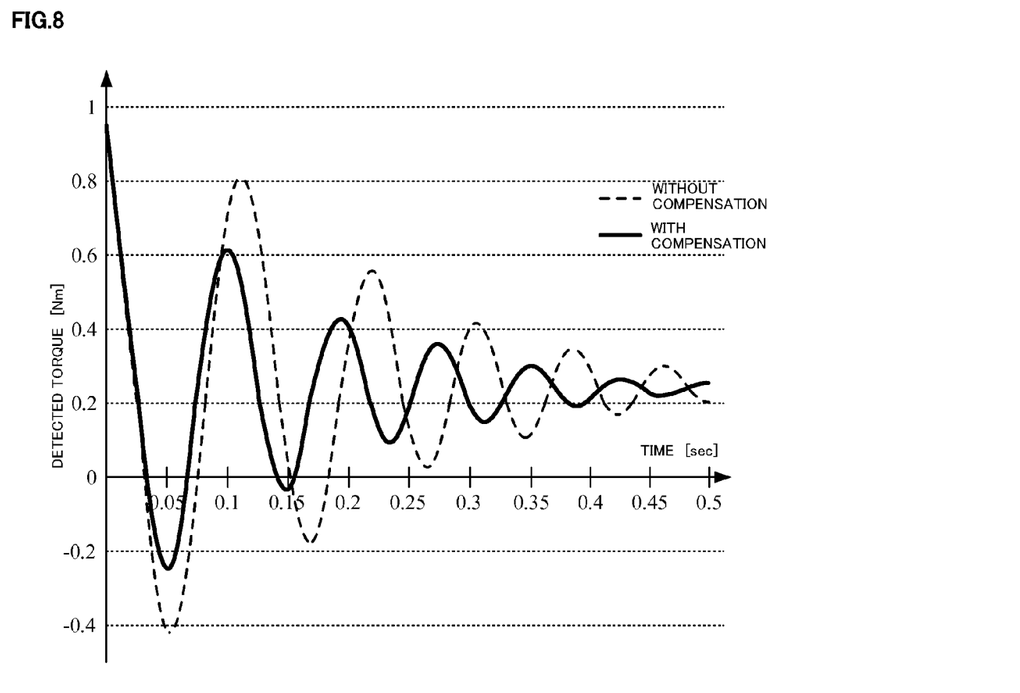
FIG. 8 is a diagram showing the effects of the present invention.

FIG. 8 shows an example of a time response of the detected torque (proportional to a torsion angle of the torsion bar) when an external disturbance torque is added at a hands-free in a state that the handle vibration easily generates with an intentional design, and compares a case (the present invention) with the vibration-damping compensation and a case (prior art) without the vibration-damping compensation. In this example, the torque sensitive-gain and the vehicle speed-sensitive gain are constant. In view of FIG. 8, it is clear that the vibration of the case with the vibration-damping compensation rapidly converges than the same of the case without the vibration-damping compensation and the vibration is effectively suppressed.

Figure 9:
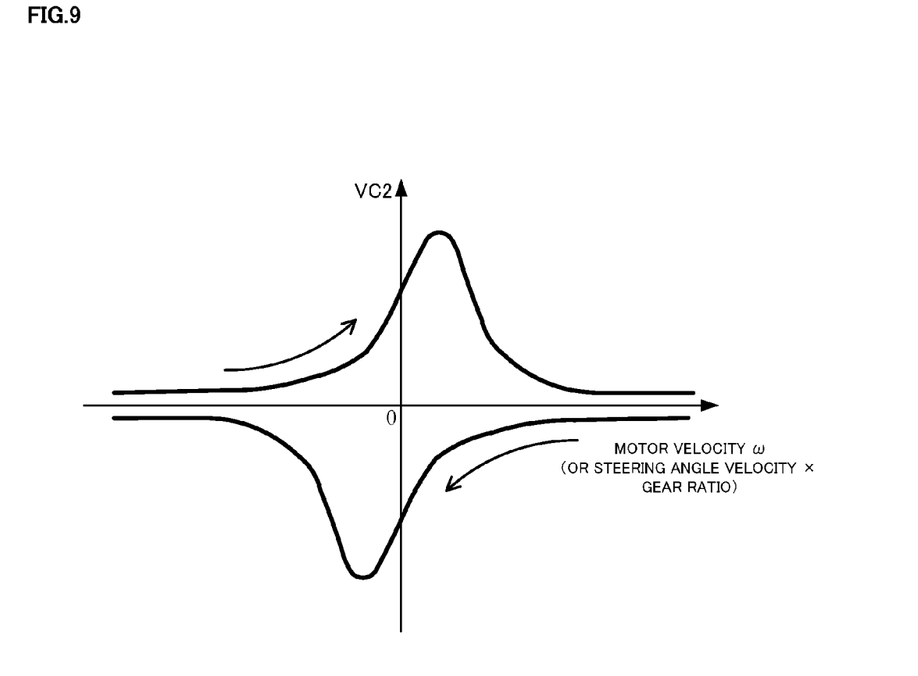
FIG. 9 is a characteristic diagram showing another characteristic of the velocity-sensitive table.

Although the vibration-damping compensating section comprises the velocity-sensitive table 41 and the BPF 42 in the above first embodiment, it may use a velocity-sensitive table having a hysteresis characteristic corresponding to a direction of the motor velocity ω as shown in FIG. 9 instead of the velocity-sensitive table 41 and the BPF 42.

Further, although the motor velocity ω is used as the input of the vibration-damping compensation in the first embodiment, a value which is multiplied the gear ratio of the reduction mechanism with the steering angle velocity is equivalent to a value corresponding to the motor velocity ω. Thus, the factor of the steering angle velocity and the gear ratio may be used as the input of the vibration-damping compensation. The steering angle velocity is detected by differentiate-calculating the steering angle from the steering angle sensor and the gear ratio of the reduction mechanism is determined in advance.

Figure 10:
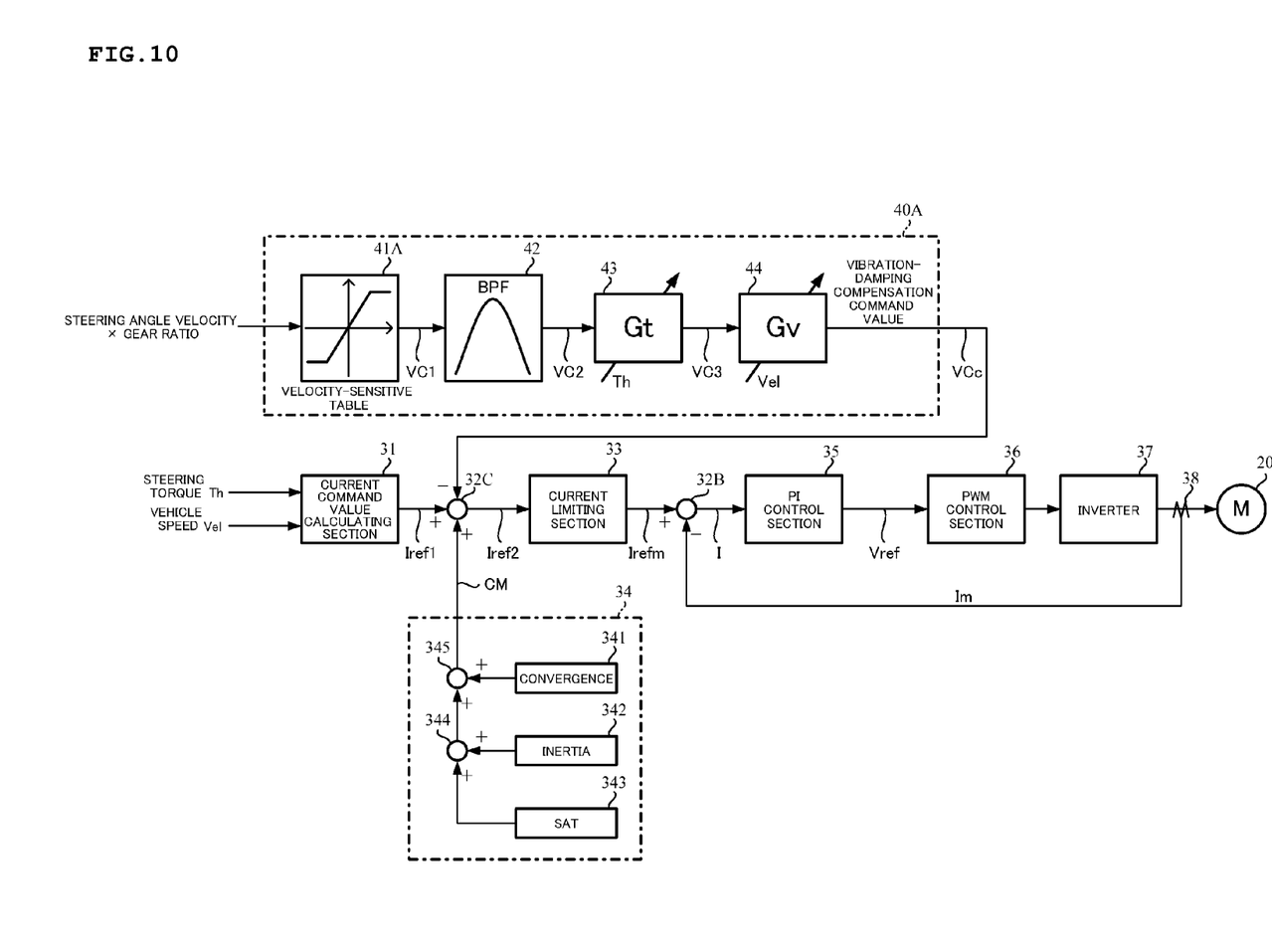
FIG. 10 is a block diagram showing a configuration example (the second embodiment) of the present invention.

A configuration (the second embodiment) in a case that the factor of the steering angle velocity and the gear ratio is used as the vibration-damping compensation input is shown in FIG. 10 corresponding to FIG. 3, and the "the steering angle velocity*the gear ratio" is inputted into a velocity-sensitive table 41A within the vibration-damping compensating section 40A. The velocity-sensitive table 41A is sensitive to "the steering angle velocity*the gear ratio" and is the same characteristic with the velocity-sensitive table 41 as described above (refer to FIG. 7), and the BPF 42, the torque-sensitive table 43 and the vehicle speed-sensitive table 44 are entirely the same with the first embodiment. The vibration-damping compensation command value VCc from the vibration-damping compensating section 40 is subtraction-inputted into the addition/subtracting section 32C and corrects the current command value Iref1 and suppresses the handle vibration.

Figure 6:
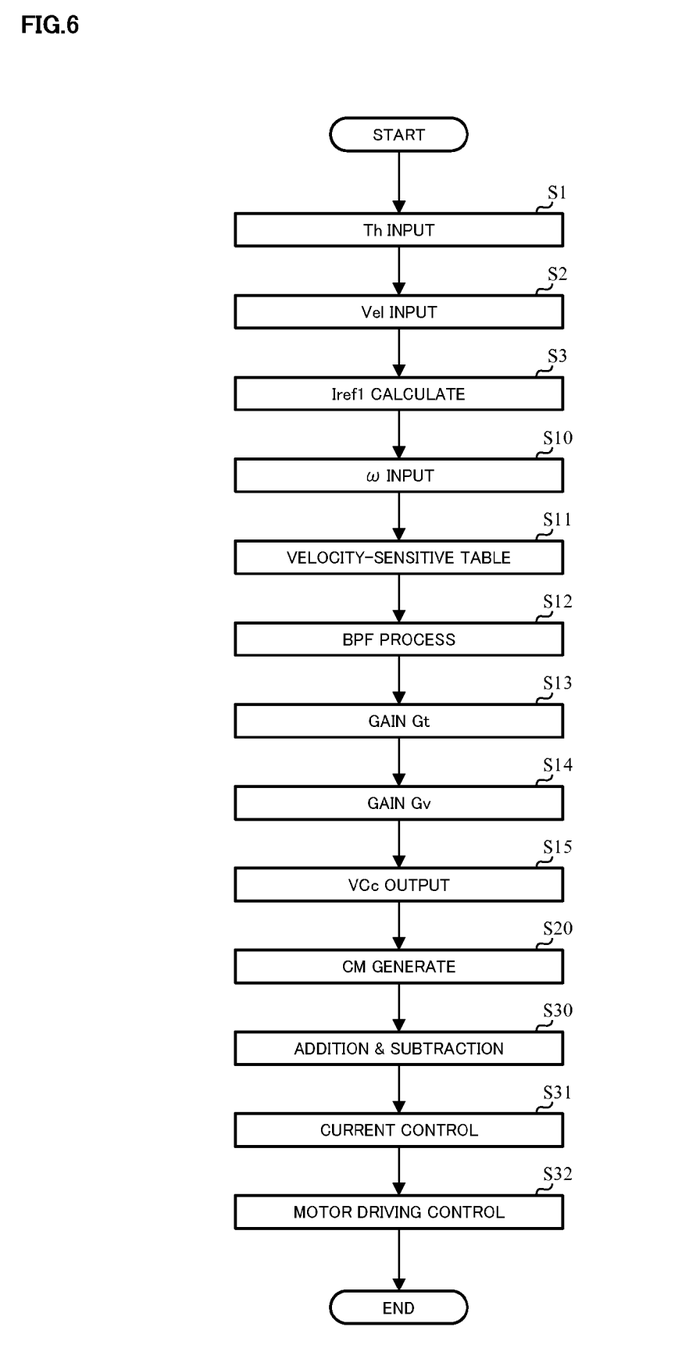
FIG. 6 is a flow chart showing an operational example (the first embodiment) of the present invention.
Figure 11:
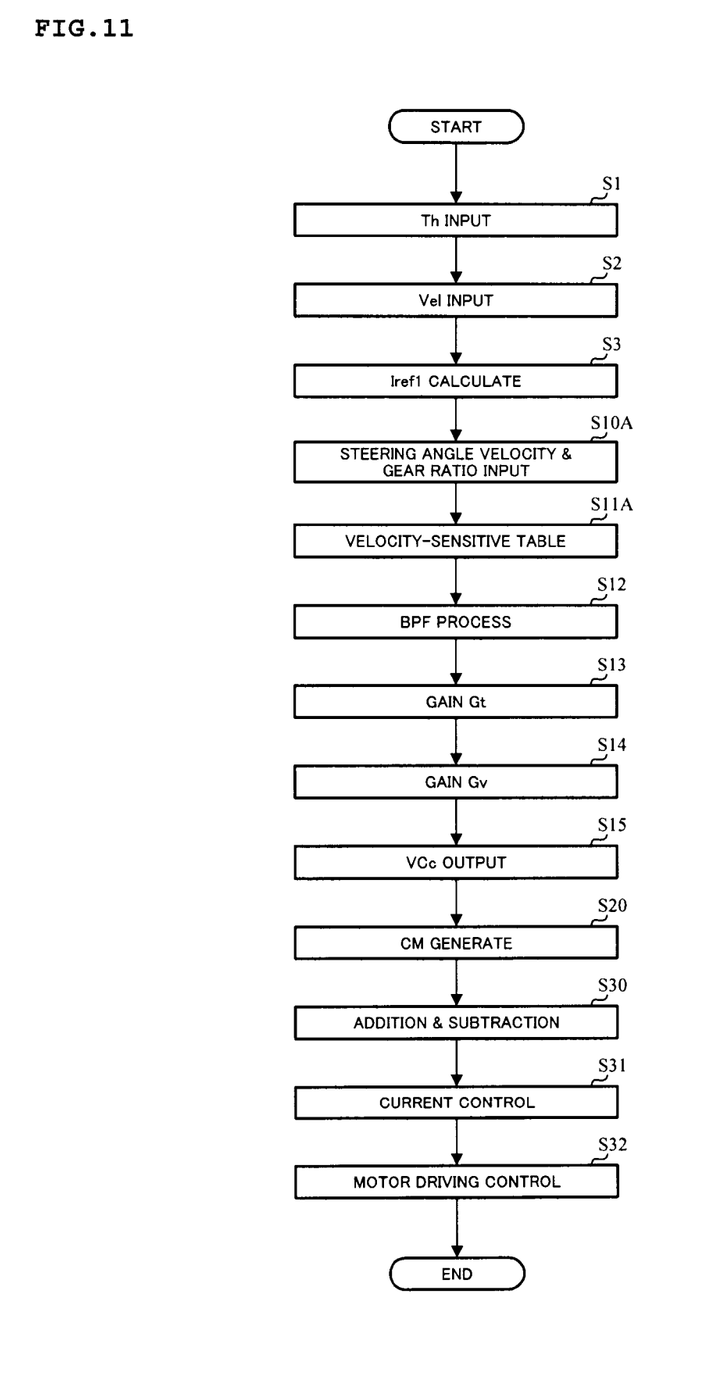
FIG. 11 is a flow chart showing an operational example (the second embodiment) of the present invention.

The operational example (the second embodiment) in the case that the factor of the steering angle velocity and the gear ratio is used as the vibration-damping compensation input is shown in a flow chart of FIG. 11 corresponding to FIG. 6. That is, the steering angle velocity and the predetermined gear ratio are inputted at the Step S10A, the vibration-damping compensation value VC1 corresponding to "the steering angle velocity*the gear ratio" is obtained at the Step S11A, and the others are the same with the first embodiment. Further, the steering angle velocity at the Step S10A may be obtained by differentiate-calculating after inputting of the steering angle θ.

According to the second embodiment, it is possible to get the effects as described above and the characteristic in FIG. 8.

Recently, there has been appeared the vehicles equipped with a parking support function (parking assist) that switch between the automatic steering mode and the manual steering mode. In a vehicle equipped with the parking support function, it is capable of performing the vibration-damping compensation during the operation of the steering angle control. The vibration-damping compensation according to the present invention may combine with a function to detect the vibration state.

Further, the torque-sensitive gain Gt is limited to the characteristic of FIG. 4 (e.g. the increasing of non-linear), and the vehicle speed-sensitive gain Gv is limited to the characteristic of FIG. 5 (e.g. the increasing of non-linear)

EXPLANATION OF REFERENCE NUMERALS 1 handle
2 column shaft (steering shaft, handle shaft)
10 torque sensor
12 vehicle speed sensor
20 motor
30 control unit (ECU)
31 current command value calculating section
33 current limiting section
34 compensation signal generating section
35 PI control section
36 PWM control section
37 inverter
40,40A vibration-damping compensating section
41, 41A speed-sensitive table
42 BPF (band pass filter)
43 torque-sensitive gain section
44 vehicle speed-sensitive gain section
50 CAN

The invention claimed is:
1. An electric power steering apparatus that assist-controls a steering by driving a motor with a current command value calculated based on at least a steering torque, comprising:

a vibration-damping compensating section that calculates a vibration-damping compensation command value for suppressing a vibration of a handle based on a motor velocity of said motor, wherein said vibration-damping compensating section comprises a motor velocity-sensitive table 1 for converting said motor velocity into a trapezoidal-wave type vibration-damping compensation value 1 and a band pass filer (BPF) to output a vibration-damping compensation value 2 by BPF-filtering said vibration-damping compensation value 1, wherein a zero-cross point of said vibration-damping compensation value 1 is coincident with a zero-cross point of said motor velocity, wherein a zero-cross point of said vibration-damping compensation value 2 is prior to said zero-cross point of said motor velocity, wherein said current command value is corrected by said vibration-damping compensation command value obtained at least in part from the vibration-damping compensation value 2, and wherein vibration amplitude of said motor near said zero-cross point of said motor velocity is suppressed.

2. The electric power steering apparatus according to claim 1, wherein said vibration-damping compensating section comprises a velocity-sensitive table 2 corresponding to said motor velocity, and a vibration-damping compensation value 3 is outputted by converting a vibration-damping compensation value 2 using said velocity-sensitive table 2.

3. The electric power steering apparatus according to claim 2, wherein said vibration-damping compensating section further including a torque-sensitive gain section to output a vibration-damping compensation value 4 by multiplying a gain 1 sensitive to said steering torque with said vibration-damping compensation value 2 or 3.

4. An electric power steering apparatus according to claim 3, wherein said vibration-damping compensating section further including a vehicle speed-sensitive gain section to output said vibration-damping compensation command value by multiplying a gain 2 sensitive to a vehicle speed with said vibration-damping compensation value 4.

5. The electric power steering apparatus according to claim 1, wherein said vibration-damping compensating section further including a torque-sensitive gain section to output a vibration-damping compensation value 4 by multiplying a gain 1 sensitive to said steering torque with said vibration-damping compensation value 2 or 3.

6. An electric power steering apparatus according to claim 5, wherein said vibration-damping compensating section further including a vehicle speed-sensitive gain section to output said vibration-damping compensation command value by multiplying a gain 2 sensitive to a vehicle speed with said vibration-damping compensation value 4.

7. The electric power steering apparatus according to claim 1, wherein the vibration damping compensation value 1 is the trapezoidal-wave type in a time domain.

8. The electric power steering apparatus according to claim 1, wherein the vibration damping compensation value 1 is converted into the vibration damping compensation value 2 by performing the BPF filtering to the vibration-dampening compensation value 1 of a trapezoidal waveform in a time domain.

9. An electric power steering apparatus that assist-controls a steering by driving a motor, through a reduction mechanism, with a current command value calculated based on at least a steering torque, comprising:

a vibration-damping compensating section that calculates a vibration-damping compensation command value for suppressing a vibration of a handle based on a factor of a steering angle velocity and a gear ratio of said reduction mechanism, wherein said factor is a multiplied value of said steering angle velocity and said gear ratio, and said vibration-damping compensating section comprises a motor velocity-sensitive table 1 for converting said factor into a trapezoidal-wave type vibration-damping compensation value 1 and a band pass filer (BPF) to output a vibration-damping compensation value 2 by BPF-filtering said vibration-damping compensation value 1, wherein a zero-cross point of said vibration-damping compensation value 1 is coincident with a zero-cross point of said multiplied value of said steering angle velocity and said gear ratio, wherein a zero-cross point of said vibration-damping compensation value 2 is prior to said zero-cross point of said multiplied value of said steering angle velocity and said gear ratio, wherein said current command value is corrected by said vibration-damping compensation command value obtained at least in part from the vibration-damping compensation value 2, and wherein vibration amplitude of said motor near said zero-cross point of said multiplied value of said steering angle velocity and said gear ratio is suppressed.

10. The electric power steering apparatus according to claim 9, wherein said vibration-damping compensating section comprises a velocity-sensitive table 2 corresponding to said steering angle velocity, and a vibration-damping compensation value 3 is outputted by converting a vibration-damping compensation value 2 using said velocity-sensitive table 2.

11. The electric power steering apparatus according to claim 10, wherein said vibration-damping compensating section further including a torque-sensitive gain section to output a vibration-damping compensation value 4 by multiplying a gain 1 sensitive to said steering torque with said vibration-damping compensation value 2 or 3.

12. The electric power steering apparatus according to claim 11, wherein said vibration-damping compensating section further including a vehicle speed-sensitive gain section to output said vibration-damping compensation command value by multiplying a gain 2 sensitive to a vehicle speed with said vibration-damping compensation value 4.

13. The electric power steering apparatus according to claim 9, wherein said vibration-damping compensating section further including a torque-sensitive gain section to output a vibration-damping compensation value 4 by multiplying a gain 1 sensitive to said steering torque with said vibration-damping compensation value 2 or 3.

14. The electric power steering apparatus according to claim 13, wherein said vibration-damping compensating section further including a vehicle speed-sensitive gain section to output said vibration-damping compensation command value by multiplying a gain 2 sensitive to a vehicle speed with said vibration-damping compensation value 4.

* * * * *